United States Patent
Ha et al.

[11] Patent Number: 6,037,907
[45] Date of Patent: *Mar. 14, 2000

[54] DUAL BAND ANTENNA FOR MOBILE COMMUNICATIONS

[75] Inventors: Dong-In Ha, Seoul; Ho-Soo Seo, Icheon; Alexandre Goudelev; Konstantin Krylov, both of Suwon, all of Rep. of Korea

[73] Assignee: Samsung Electronics Co., Ltd., Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/966,943

[22] Filed: Nov. 10, 1997

[30] Foreign Application Priority Data

Jun. 17, 1997 [KR] Rep. of Korea ............. 97-25177

[51] Int. Cl.[7] ................................. H01Q 9/16

[52] U.S. Cl. .................. 343/752; 343/790; 343/749; 343/792

[58] Field of Search ................... 343/752, 790, 343/791, 792, 749; 29/802, 829, 715, 900

[56] References Cited

U.S. PATENT DOCUMENTS

| | | | |
|---|---|---|---|
| 2,239,724 | 4/1941 | Lindenblad | 343/791 |
| 4,509,056 | 4/1985 | Ploussios | 343/791 |
| 5,248,988 | 9/1993 | Makino | 343/792 |

*Primary Examiner*—Don Wong
*Assistant Examiner*—James Clinger
*Attorney, Agent, or Firm*—Dilworth & Barrese

[57] ABSTRACT

A dual band antenna for mobile communications includes a rod-shaped radiating element having a first portion of a predetermined length connected to a coaxial feed line, and a second portion of a specified length integrally extended from the first portion. The coaxial feed line connects to a ground plate, and a first capacitive load connects to the first portion of the radiating element. A choke surrounds the second portion of the radiating element, and has a shorting end connected to a distal end of the second portion and an open end at a proximal end of the second portion. A second capacitive load connects to the shorting end of the choke. In a higher operating band of the dual band, the input impedance of the choke is high, such that only the first (lower) portion of the radiating element radiates. At a lower operating band of the dual band, the choke's input impedance is lower to allow for radiation from the entire length of the antenna.

20 Claims, 3 Drawing Sheets

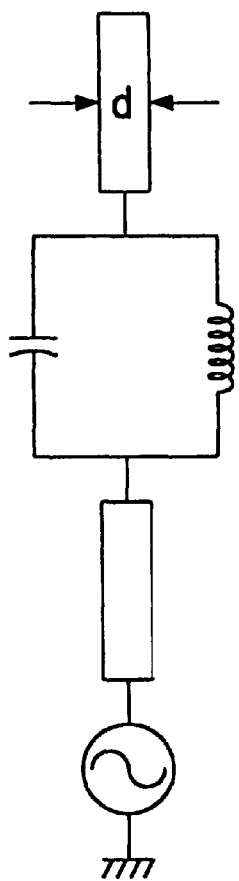 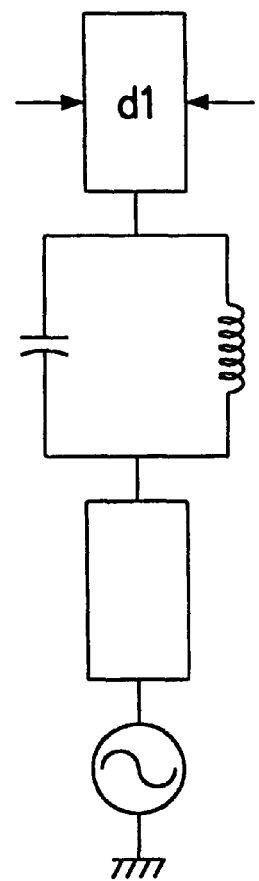
*FIG. 3A*  *FIG. 3B*

DUAL BAND ANTENNA FOR MOBILE COMMUNICATIONS

BACKGROUND OF THE INVENTION

1. Field of the Invention

The present invention relates to antennas, and more particularly, to a dual band antenna for mobile communications.

2. Description of the Related Art

With the rapid progress of mobile communications, the capacity of existing systems is becoming saturated, and thus, new systems are being developed at new frequencies to enhance capacity. Accordingly, the interrelationship between existing and new systems must be taken into consideration in the design of mobile communications equipment. For mobile communications antennas, major design concerns are power efficiency and effective use of frequency.

In practice, it is desirable in the Republic of Korea (South Korea) to interlink the existing CDMA (Code Division Multiple Access) system with the new PCS (Personal Communication System) system, in the U.S.A. to interlink the existing AMPS (Advanced Mobile Phone Service) system with the PCS system, and in Europe to interlink the existing GSM (Groupe Speciale Mobile) system with the DCS (Digital Communication System) 1800 system. Generally, a "dual band system" is a system that allows for communications within two different systems at different frequency bands, such as in above examples. It is desirable to manufacture communications equipment capable of operating within dual band systems.

Heretofore, each radio telephone terminal in the dual band systems are provided with two separate miniature antennas for two different bands, which results in increased production cost. Also, the use of two antennas for this purpose is an obstacle to the miniaturization of the radio telephone terminal, and results in an inconvenience to the user. For these reasons, it is required to develop a dual band antenna capable of being used for both bands.

U.S. Pat. No. 4,509,056 discloses a multi-frequency antenna employing a tuned sleeve choke. Referring to FIG. 1, an antenna of the type disclosed in that patent is shown. This antenna operates effectively in a system in which the frequency ratio between operating frequencies is 1.25 or higher. The internal conductor 10 connected to coaxial feed line 2 and the sleeve choke 12$i$ act as a radiating element. The feed point of sleeve choke 12$i$ is short-circuited and the other end thereof is open. The lengths of conductor 10 and sleeve choke 12$i$ are designed so as to achieve maximum efficiency at a desired frequency.

The choke 12$i$ is partially filled with dielectric material 16$i$ that is dimensioned so that the choke forms a quarter wavelength transmission line and prevents coupling between the shell 14$i$ and the extension 10 at the open end of the choke at the highest frequency. At some lower frequency of operation, the choke 12$i$ becomes ineffective as an isolation element and the entire length P of the structure from the ground plane to the end of the conductor, becomes a monopole antenna at the lower resonant frequency.

The coupling between conductor 10 and sleeve choke 12$i$ occurs at the open end of sleeve choke 12$i$. That is, when the length $$l = \frac{\lambda}{4},$$

the choke acts as a high impedance, whereby the coupling between conductor 10 and sleeve choke 12$i$ is minimal. When $$\frac{\lambda}{4} \neq l,$$

the choke acts as a low impedance, whereby the coupling between conductor 10 and choke 12$i$ is higher. The electrical length of choke 12$i$ can be adjusted by varying the dielectric constant of dielectric material 16$i$.

The construction consisting of internal and external conductors 10, 14$i$ is regarded as coaxial transmission, and its characteristic impedance is expressed as follows:

$$Z_c = 59.95 / \sqrt{\varepsilon_r} \ln(D/d) \qquad \text{[Equation 1]}$$

where $\varepsilon_r$ is dielectric constant, D is the diameter of the external conductor, and d is the diameter of the internal conductor. The input impedance between internal and external conductors 10, 14$i$ is denoted by the following equation:

$$Zin = Z_c Z_L + \frac{jZ_c \tanh \gamma \cdot l}{Z_C + jZ_L \tanh \gamma \cdot l} \qquad \text{[Equation 2]}$$

where $\gamma = \alpha + j\beta$, $\alpha$ is attenuation factor, $\beta$ is propagation constant, l is length of transmission line, and $Z_L$ is load impedance.

In the antenna of FIG. 1, the ground plate 20 and external conductor 14$i$ are structurally adjacent to each other, thereby causing parasitic capacitance which degrades the antenna efficiency. To improve the antenna efficiency, the parasitic capacitance can be decreased. Accordingly, in the construction of FIG. 1, the diameter of external conductor 14$i$ must be reduced for this purpose, which is ultimately the same as the reduction of characteristic impedance of choke 12$i$ according to the above equation (1). That is, such reduction in the characteristic impedance of choke 12$i$ gives rise to a change in the amount of coupling, resulting in a degradation of the antenna's performance.

Thus, to minimally affect the amount of coupling and to keep the characteristic impedance of choke 12$i$ essentially the same as it was previously (i.e., before the diameter of conductor 14$i$ changed), the diameter of internal conductor 10 must be reduced. This results in a reduction in the antenna's bandwidth. Therefore, when the antenna is manufactured in such a manner, the same cannot satisfactorily cover the frequency bandwidth required for the system.

Further, since the dielectric material is employed to adjust the quantity of coupling, the dielectric constant and the dimension of the dielectric material must be accurately selected for proper coupling.

SUMMARY OF THE INVENTION

Accordingly, it is an object of the present invention to provide a dual band antenna with improved performance and bandwidth, by minimizing parasitic capacitance between a ground plane and an external conductor thereof.

It is another object of the present invention to provide a dual band antenna which has a simple and compact structure and high performance.

It is still another object of the present invention to provide a dual band antenna which is inexpensive and convenient to use.

In an exemplary embodiment of the present invention, a dual band antenna for mobile communications includes a rod-shaped radiating element having a first portion of a predetermined length connected to a coaxial feed line, and a second portion of a specified length integrally extending from the first portion. The coaxial feed line connects to a ground plate, and a first capacitive load connects to the first portion of the radiating element. A choke surrounds the second portion of the radiating element, and has a shorting end connected to a distal end of the second portion and an open end at a proximal end of the second portion. A second capacitive load is connected at the shorting end of the choke. In a higher operating band of the dual band, the input impedance of the choke is high, such that only the first (lower) portion of the radiating element radiates. At a lower operating band of the dual band, the choke's input impedance is lower to allow for radiation from the entire length of the antenna.

BRIEF DESCRIPTION OF THE DRAWINGS

FIGS. 3A and 3B are circuit diagrams illustrating equivalent circuits of the antennas of FIGS. 1 and 2, respectively.

DETAILED DESCRIPTION OF THE PREFERRED EMBODIMENT

Figure 1:
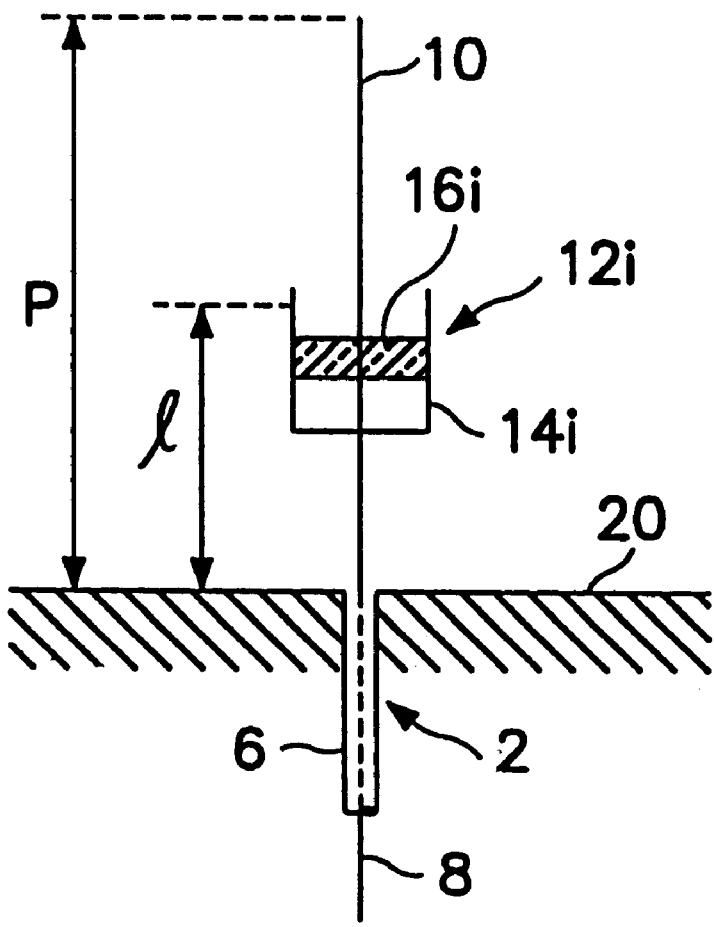
FIG. 1 is a sectional view of a monopole antenna operating at dual frequencies according to a conventional embodiment of multi-frequency antenna employing tuned sleeve chokes.

An exemplary embodiment of the present invention will now be described more specifically with reference to the drawings attached only be way of example. It is to be noted that like reference numerals and characters used in the accompanying drawings refer to like constituent elements.

Figure 2:
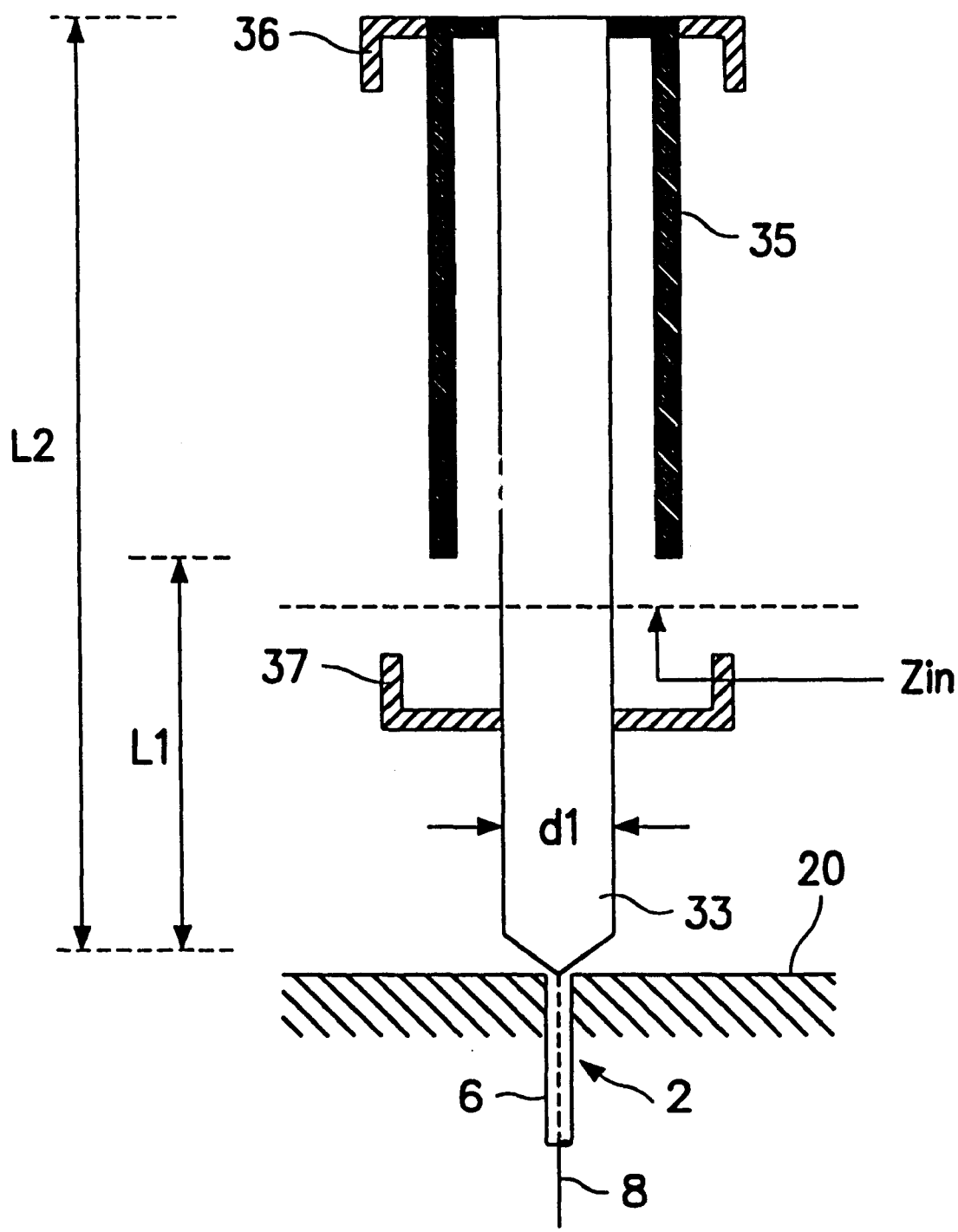
FIG. 2 is a sectional view illustrating the construction of a dual band antenna according to an embodiment of the present invention.

Referring now to FIG. 2, an antenna in accordance with the invention includes a choke 35 formed as a metal pipe, with the lower end of the choke being open. A rod-shaped radiating element 33 is positioned within choke 35, with an upper end of radiating element 33 being connected to an upper end of the choke (short-circuited end). The open circuited end of choke 35 is approximately at a distance L1 from ground plane 20. A lower end of radiating element 33 is connected to internal conductor 8 of coaxial feed line 2. A capacitive load 36 is connected to the short-circuited end portion of choke 35. Another capacitive load 37 is connected to radiating element 33 at a specified distance downward from the open-end of choke 35.

Capacitive load 36 can be either a coaxial cylinder or a parallel wire or wires. In the embodiment of FIG. 2, capacitive load 36 is symmetrical with respect to radiating element 33; however, it may alternatively be asymmetrical with respect to the radiating element in other embodiments. The provision of capacitive loads 36, 37 permits the overall antenna length to be shorter than the physical length of the well-known quarter-wave monopole antenna.

Since the impedance of choke 35 (in conjunction with the radiating element 33 inserted therein) changes as a function of frequency, this characteristic can be advantageously used to enable the antenna of FIG. 2 to operated simultaneously in two different frequency bands. For instance, choke 35 can be designed with a length of $\gamma/4$ at the center frequency of a high frequency band, e.g., 1,700–1,990 MHz such that only the first portion of radiating element 33 radiates in the high band. At a low enough frequency, the entire antenna of length L2 radiates.

The input impedance Zin at the choke 35 input terminal at the high frequency band is determined in accordance with the above equation (2). Zin can also be expressed by the following equation (3) because the load impedance $Z_L$ is a short-circuit:

$$Zin = jZ_c \tan h\gamma \cdot 1 \qquad \text{[Equation 3]}$$

If the attenuation factor $\alpha$ is ignored (i.e., $\alpha=0$), Zin is denoted by the following equation (4):

$$Zin = jZ_c \tan h\beta \cdot 1 \qquad \text{[Equation 4]}$$

where $\beta$ is the propagation constant "$2\pi/\lambda$".

By using eqn. (4), the input impedance Zin when $1=\lambda/4$ can be expressed by the following equation (5):

$$Zin = jZ_c \infty \qquad \text{[Equation 5]}$$

As the calculation result above indicates, the input impedance of choke 35 in the higher frequency band becomes almost infinite, whereby only the lower portion (hereinafter referred to as "first portion") of radiating element 33 below the open-end of choke 35 radiates. The remaining portion of radiating element 33, i.e., the portion inserted into choke 35 (hereinafter referred to as the "second portion" of the radiating element) does not radiate when the choke input impedance is very high, which is preferably the case within the higher frequency band. As a result, in the high frequency band, the antenna of FIG. 2 operates as a $\lambda/4$ monopole antenna having a length of L1 (assuming that the length L1 is selected to correspond to about $\lambda/4$ at a frequency within the higher frequency band). In the lower frequency band of the dual band, the choke 35 input impedance is lower, whereby choke 35 and radiating element 33 are electrically coupled. Thus, in the lower band, the antenna operates as a ¼ wavelength monopole antenna having a length of L2 (assuming that the length L2 is selected to correspond to about $\lambda/4$ at a frequency within the lower frequency band). As mentioned above, the capacitive loading of loads 36 and 37 will affect the exact lengths selected for L1 and L2.

In the following discussion, examples are presented illustrating the variation, as a function of frequency, of the input impedance of choke 35 within the antenna of FIG. 2 for specific frequencies. As a first example, the impedance variation within the PCS frequency band of Korea Telecom is expressed by the following equation 6:

$$Fhmin = 1{,}750 \text{ MHz} \rightarrow Zin = jZc^*14$$

$$Fhmax = 1{,}870 \text{ MHz} \rightarrow Zin = -jZc^*14, \qquad \text{[Equation 6]}$$

where Fhmin and Fhmax are the minimum and maximum frequencies, respectively, within the band.

Since the characteristic impedance Zc of choke 35 is governed by the above eqn. (1), the characteristic impedance is calculated by substituting the actual value in eqn. (1), resulting in the following eqn.(7):

$$Zc = 59.95/\sqrt{1} \ln(3/1) \approx 65.86 \qquad \text{[Equation 7]}$$

Therefore, the amount of input impedance variation at frequencies in the above PCS frequency band can be expressed by the following eqn. (8):

$$Fh\text{min}=1,750\ \text{MHz} \rightarrow Z\text{in}=j65.86*14=j922.06\ \text{ohm}$$

$$Fh\text{max}=1,870\ \text{MHz} \rightarrow Z\text{in}=-j65.86*14=-j922.06\ \text{ohm}.\quad[\text{Equation 8}]$$

As calculated above, since the input impedance Zin is high, the choke 35 does not operate as a radiating element in the higher frequency band.

Next, the input impedance Zin at the input terminal of choke 35 in the CDMA (800 MHz) frequency band is calculated as the following equation (9):

$$Fl\text{min}=824\ \text{MHz} \rightarrow Z\text{in}=j65.86*0.85=j55.98\ \text{ohm}$$

$$Fl\text{max}=894\ \text{MHz} \rightarrow Z\text{in}=-j65.86*0.97=-j64.3\ \text{ohm}\quad[\text{Equation 9}]$$

where Flmin and Flmax are the lowest and highest frequencies, respectively, within the band.

As a result, in the lower frequency band, the choke 35 and the radiating element 33 are coupled, such that the entire length L2 of the antenna radiates. Thus, if L2 is selected to correspond to a quarter wavelength at a frequency within the lower frequency band, the antenna acts as a quarter wavelength monopole antenna.

As illustrated in FIG. 2, since the choke 35 is separated from coaxial feed line 2 and ground plate 20 by a significant distance, e.g., by about the distance corresponding to λ/4 at the center of the higher frequency band, the effect of parasitic capacitance is thereby reduced. Also, the diameter d1 of radiating element 33 can be made larger than the diameter d of the antenna shown in FIG. 1, thereby allowing for a wider operating bandwidth as compared to that prior art antenna.

With reference now to FIGS. 3A and 3B, there are shown lumped element equivalent circuits for the antennas of FIGS. 1 and 2, respectively. The coupling between radiating element 33 and choke 35 is a function of the shown capacitor and inductor, and the radiating element 33 is divided into first and second portions with the parallel LC resonant circuit in between.

Since the above-described antenna of the present invention has a broad bandwidth, the same single antenna can be used within a dual band system such as GSM/DECT, GSM/DCS1800, AMPS, or CDMA(824 MHz–894 MHz/PCS systems. In addition, the above-described antenna can be used for dual bands in which the separation between the upper and lower frequency bands is not an integer multiple of ¼ wavelength. For this case, the antenna can be designed via appropriate selection of lengths for the first and second portions of the radiating element, and tuning can be effected by using appropriate upper and lower capacitance loadings.

It will be readily appreciated that an antenna manufactured in accordance with the present invention has the advantage of a simple and compact structure with high performance, while being easy to manufacture, inexpensive and convenient to use.

As described above, although the present invention has been described in detail with reference to the specific embodiment, it must be in no way construed as a limitation of the invention itself, and it will be apparent to those skilled in the art that many changes and modifications may be made thereto without departing from the spirit of the present invention. Accordingly, the appended claims cover all such changes and modifications which fall within the spirit and scope of the present invention.

What is claimed is:

1. A dual band monopole antenna for mobile communications comprising:
    a rod-shaped radiating element having a first portion of a predetermined length connected to an inner conductor of a coaxial feed line, and a second portion of a specified length integrally extending from said first portion and having an outer surface;
    a ground plate connected to an outer conductor of said coaxial feed line; and
    a choke surrounding said outer surface of said second portion of said radiating element, said choke having a shorting end connected to a distal end of the second portion and an open end at a proximal end of the second portion to define an interior compartment longitudinally extending from said shorting end to said proximal end of the second portion.

2. The dual band antenna of claim 1, further comprising a first capacitive load connected to the first portion of said radiating element and a second capacitive load connected at the shorting end of said choke, said capacitive loads functioning to increase the electrical length of said antenna.

3. The dual band antenna of claim 2, wherein said first and second capacitive loads each comprise a horizontal planar portion and an annular vertical portion formed on a circumference of said horizontal planar portion.

4. The dual band antenna of claim 1, wherein said horizontal planar portion of said first capacitive load is annularly connected to the shorting end of said choke, and said annular vertical portion of the first capacitive load extends downward a pre-established distance towards the first portion of said radiating element.

5. The dual band antenna of claim 2, wherein said first capacitive load comprises parallel wires.

6. The dual band antenna of claim 2, wherein said second capacitive load comprises parallel wires.

7. The dual band antenna of claim 2, wherein said second capacitive load is constructed so as to be connected to a peripheral surface of said choke and to surround an outer portion of said choke by a specified length.

8. The dual band antenna of claim 1, wherein said antenna operates in a predetermined high frequency band of said dual band as an antenna having a length as long as said first portion of said radiating element, and in a relatively lower frequency band of said dual band as an antenna having a length combining both of said first and second portions of said radiating element.

9. The dual band antenna of claim 8, wherein said lower frequency band is a range of about 824 MHz–960 MHz, and said relatively higher frequency band is a range of about 1,700 MHz–1,990 MHz.

10. The dual band antenna of claim 1, wherein said first portion has a length of about a quarter wavelength at a center frequency of a high frequency band of said dual band, and said first and second portions have a combined length of about a quarter wavelength at a frequency within a lower frequency band of said dual band.

11. A dual band monopole antenna for mobile communications comprising:
    a hollow cylindrical metal choke having a diameter D1, one end thereof being open;
    a radiating element having a first end connected to an inner conductor of a coaxial feed line and a second end disposed within said choke and connected to a short-circuited end of said choke;
    a ground plane connected to an outer conductor of said coaxial feed line;

a first capacitive cylindrical load connected to the short-circuited end of said choke having a diameter D2; and a second capacitive cylindrical load connected to said radiating element at a predetermined distance from the open end of said choke and having a diameter D3, wherein D1<D3 and D2 is substantially equal to D3.

12. The dual band antenna of claim 11, wherein in a high frequency band of the dual band, only a portion of said radiating element corresponding to a lower part below said open-end of said choke operates as an antenna, and in a relatively lower frequency band of the dual band, said radiating element and said choke are coupled, whereby radiation occurs from an entire length of said antenna comprising lengths of said first and second portions.

13. The dual band antenna of claim 12, wherein said lower frequency band is a range of about 824 MHz–894 MHz, and said high frequency band is a range of about 1,710 MHz–1,990 MHz.

14. A dual band monopole antenna comprising:

a radiating element having a lower portion with a proximal end connected to a feed line;

a hollow cylindrical choke surrounding an upper portion of said radiating element and having a first end electrically connected to a distal end of said radiating element and a second end which is open to form a compartment extending between said first end and said second end;

wherein in a predetermined high operating frequency band, said choke exhibits a high input impedance such that only the lower portion of said radiating element radiates, and in a predetermined low operating frequency band, said choke exhibits a lower input impedance such that radiation occurs from an entire length of said antenna including a length of the upper and lower portions of said radiating element.

15. The antenna of claim 14, further comprising a first capacitive load connected at the short-circuited end of the choke and a second capacitive load connected to the lower portion of said radiating element.

16. The antenna of claim 15, wherein said feed line comprises a coaxial feed line.

17. The antenna of claim 16, further comprising a ground plane coupled to an outer conductor of said coaxial feed line.

18. The antenna of claim 14, wherein said radiating element is shaped as a rod.

19. The antenna of claim 15, wherein said second capacitive load has a generally cylindrical outer vertical portion and a planar horizontal portion, said vertical portion annularly connects to a periphery of said horizontal portion, and an inner surface of said horizontal portion connects to said radiating element.

20. The antenna of claim 15, wherein said first capacitive load has a generally cylindrical outer vertical portion and a planar horizontal portion, said vertical portion annularly connects to a periphery of said horizontal portion, and an inner surface of said horizontal portion connects to an outer surface of said short-circuited end of said choke.

* * * * *